Sept. 22, 1964  J. O. GARRISON  3,149,853

CHUCK

Filed July 13, 1961

INVENTOR.
JAMES O. GARRISON
BY Tom Walker
ATTORNEY

3,149,853
CHUCK

James O. Garrison, Dayton, Ohio, assignor to Garrison Machine Works, Inc., Dayton, Ohio, a corporation of Ohio
Filed July 13, 1961, Ser. No. 123,736
11 Claims. (Cl. 279—106)

This invention relates to chucks, having particular although not limited reference to gear chucks providing jaws to grip and hold an interposed workpiece.

The object of the invention is to simplify the construction as well as the means and mode of operation of chucks, whereby such chucks may not only be economically manufactured, but will be more efficient and satisfactory in use, adaptable to a wide variety of applications, and be unlikely to get out of order.

A further object of the invention is to provide a chuck as described especially adapted for use in an automatic loading system.

Another object of the invention is to provide a chuck as described characterized by a high degree of simplicity in its construction and mode of operation.

A further object of the invention is to construct the chuck with a particular view to simplified modification thereof to make the chuck readily adaptable for use with workpieces of differing size and structural characteristics, a feature of the invention residing in the use of a locator plate removably carrying all of the workpiece engaging portions of the chuck and which is itself detachably installed on the chuck body.

A still further object of the invention is to provide a new shedder or ejector means in a chuck as described cooperating with the chuck jaws to assure an operation of the ejector means upon release of the workpiece by the jaws.

A further object of the invention is to provide a chuck possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Figure 1:
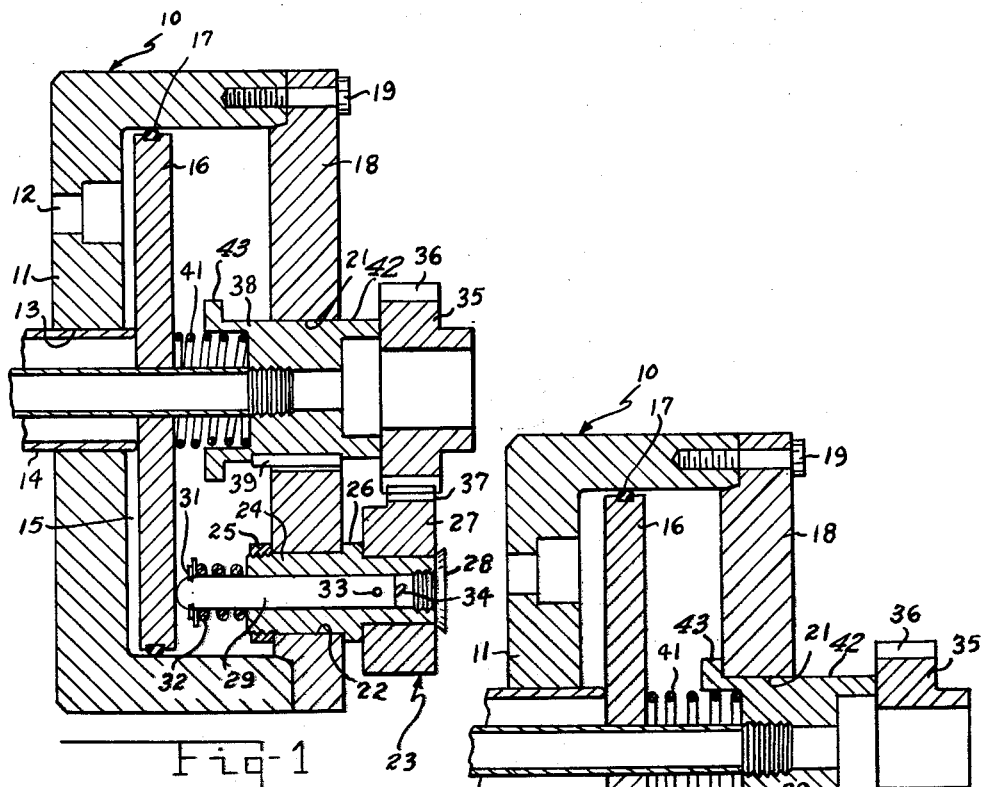
Figure 2:
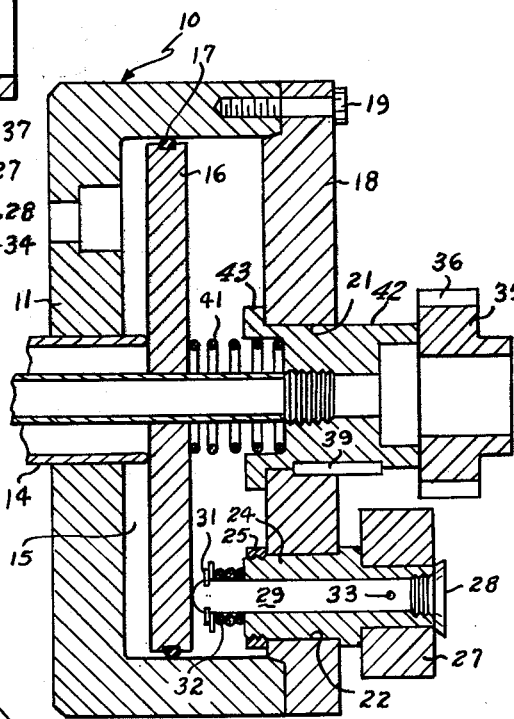
Figure 3:
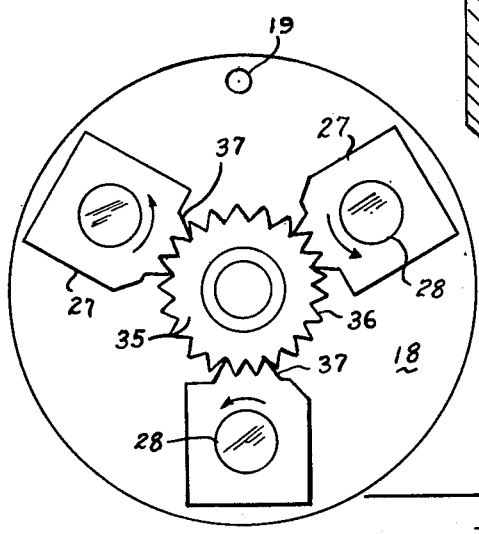

Referring to the accompanying drawing wherein is shown one but obviously not necessarily the only form of embodiment of the invention, FIG. 1 is a view in longitudinal section of a chuck in accordance with the illustrated embodiment of the invention, the chuck being shown loaded, or with a workpiece in place thereon, and locked-up with the shuck jaws gripping and holding the workpiece;

FIG. 2 is a view like FIG. 1, showing the parts as they appear with the chuck jaws moved out of gripping position to a releasing position and with the workpiece being ejected from the chuck by the ejector or shedder member; and FIG. 3 is a view in front elevation showing a chuck locked-up upon a workpiece as in FIG. 1.

Like parts are indicated by similar characters of reference throughout the several views.

Referring to the drawings, a chuck in accordance with the illustrated embodiment of the invention is a machine mounted device comprising a cup shaped body 10, the closed or bottom side of which is formed as a planar wall 11. Openings 12 in the wall 11 provide for mounting of the body 10 to a rotary means in a machine tool or the like. The wall 11 also provides through a central opening 13 therein for entrance of a draw bar 14, this being a machine element accomplishing by a reciprocating motion locking and opening of the chuck. The bar 14 has an inner end projecting through and beyond the wall 11 and terminating within the chuck body 10 in a recess 15 therein. A pressure plate 16 is slidably received in the recessed area 15 and is engageable on its one side by the inner end of draw bar 14. Plate 16 has a floating mounting in the body and contacts the cylindrical wall of recessed area 15 through a peripheral bearing 17.

The face of body 10 opposite bottom wall 11 is open but in the normal assembly of the chuck is closed by a mounting or locating plate 18 detachably held to the body by bolts 19. The plate 18 is formed with a central through longitudinal opening 21 and with surrounding radially disposed openings 22 also extending longitudinally through the plate. There is in the illustrated instance three of the openings 22 spaced equidistantly about the central opening 21 and providing a mounting for respective individual chuck jaw assemblies 23. The described assemblies are identical to one another. Each comprises a bushing 24 received in an opening 22 with its opposite ends projecting through and beyond the ends of such opening. The inner end of the bushing, or that end projecting into the recessed area 15, is threaded and has a nut 25 thereon by which a flanged shoulder 26 on the outer projecting end of the bushing may be drawn to a seat upon the plate 18 thus holding the bushing against motion relative to the plate. Beyond the flanged shoulder 26 the outwardly projecting end of the bushing 24 is reduced in diameter and has a chuck jaw 27 rotatably mounted thereon. A screw cap 28 is received in the outer end of the bushing 24 and holds the jaw 27 in place on the bushing without inhibiting its relative rotary motion.

Slidably mounted with each bushing 24 is a cam post 29 projecting through and beyond the described inner end of the bushing and carrying a retainer disc 31 on its inner extremity. A compression spring 32 is interposed between the inner end of bushing 24 and retainer 31 and urges the cam post 29 inwardly, such movement being limited by engagement of the post with the pressure plate 16 on the side thereof opposite that engaged by the draw bar 14. At its other end the cam post 29 carries radially projecting pin means 33 which projects through inclined cam slots 34 in the bushing 24 and engages the jaw 27. The connection so afforded between post 29 and jaw 27 accordingly converts a reciprocating motion of the post 29 into an oscillatory motion of the chuck jaw.

The described oscillatory motion of the jaws 27 is used to achieve gripping and releasing positions of the several jaws with respect to an interposed workpiece, for example a spur gear 35 as shown. The gear 35 has peripheral teeth 36 and when gripped is held by virtue of the engagement of these teeth with a segmental rack portion 37 on each jaw 27. Thus each jaw 27 has a release position substantially as indicated in FIG. 2 wherein the rack segment 37 thereof is moved out of engagement with the toothed periphery of an interposed workpiece, leaving a preceding workpiece freedom to be removed and a succeeding workpiece freedom to be introduced into position between or among the jaws. From this, which is the open position of the chuck, the jaws 27 are movable to the position as shown in FIGS. 1 and 3 wherein the rack segments 37 achieve a camming, intermeshed engagement with the teeth of the workpiece in a manner to hold the piece firmly against lateral or rotary displacement. This is the closed or locked-up position of the chuck.

In accordance with the construction and arrangement of the parts, motion of the chuck jaws 27 to gripping position is accomplished under the influence of the individual compression springs 32 which provide a yield if necessary in the interengagement of the jaws and workpiece but which are sufficiently strong to effect a firm, secure gripping of the workpiece. The motion of the cam posts 29 thus is inward to achieve a gripping motion of the chuck jaws and outward to achieve a releasing motion thereof. The springs 32, being strong as noted, tend to hold the post 29 normally inward, displacing the pressure plate 16 toward the bottom of recessed area 15 and maintaining engagement thereof with the inner end of draw bar 14. Under machine actuation, the draw bar 14 may move positively inward and displace the pressure plate in the opposite direction against the urging of springs 32. A corresponding axial thrust outwardly thus is delivered to the cam posts 29 which through the connections 33–34 rock the jaws 27 to a releasing position. The parts are so held until the powered actuation delivered to draw bar 14 is released whereupon the elements of the chuck return to a locked-up or gripping position under the urging of springs 32.

The central opening 21 in the mounting plate 18 receives a cylindrical ejector or shedder member 38. This member has its opposite ends projecting on opposite sides of the plate 18 and is connected to the plate for relative longitudinal and unison rotary motions by means including a key 39. The inner projecting end of the member 38 is recessed to provide partial confinement for a relatively light compression spring 41 interposed between such inner end of the ejector member and the pressure plate 16. The opposite or outer projecting end of the ejector member is formed with a cylindrical skirt 42 adapted to be contacted by the underside of the workpiece 35. The spring 41 tends to maintain a relatively projected position of the member 38, particularly when the pressure plate 16 moves under the thrust of the draw bar 14 to the position as shown in FIG. 2. This motion, tending to compress the spring 41, extends or projects the member 38 outward, with such motion being limited by a flange 43 on the inner end of the member engageable with the inner side of the mounting plate 18. Now, upon advance of the workpiece 35 into a cooperative relationship with the chuck jaws 27, which jaws lie in a common plane adjacent to and approximately parallel to the plane of plate 18, the workpiece encounters the ejector member prior to reaching the plane of the chuck jaws and displaces the member inwardly, compressing or further compressing the spring 41. The spring is retained under full or part compression as the draw bar 14 retracts to enable locking-up of the chuck under the urging of springs 32. Upon subsequent actuation of the draw bar to open the chuck, plate 16 moves to reapply compression to the spring 41, at the same time an outward thrust is being delivered to the cam posts 29 to rock jaws 27 to releasing position. Thus, as soon as the segmental racks 37 on the jaws 27 clear the workpiece 35 the stored force in spring 41 is released and ejector member 38 is propelled outwardly to the position shown in FIG. 2, ejecting or shedding the finished workpiece from the chuck.

The described construction and arrangement of parts results in a chuck adapted for facile loading and unloading in either a manual or automatic system of supply. In the case of the latter, gears for working are brought successively to the chuck, each being presented in turn to the working chuck face which is that presented by plate 18 and its externally mounted workpiece engaging elements. An inwardly moving workpiece contacts and depresses the member 38 as described, storing therein in conjunction with the movements of the pressure plate 16 a force for subsequent automatic ejection and removal of the workpiece when the chuck is opened.

According to a further feature of the invention the described work face of the chuck is renewable and variable to accommodate gears and workpieces of differing sizes and structural characteristics. Upon detaching of the plate 18, by removal of bolts 19, a completely different mounting or locating plate may be reinstalled on the chuck body using the same or a different set of chuck jaw assemblies 23. Thus, if the substitution of parts is made in respect of the size of workpiece to be accommodated, a new mounting plate is supplied which differently positions the mounting holes 22 relative to the central opening 21. A change in chuck jaw assemblies may result from a change in the characteristics of the workpiece, for example the chucking of a bevel gear. In this connection, the means to grip and hold a workpiece have been generally referred to herein as "jaws." This term is used in a non-restrictive sense, identifying not only segmental rack members such as the members 27 hereof but arms, fingers and like snubbing devices adapted in a rocking motion to achieve gripping and releasing positions relative to an interposed workpiece.

The concept of substitution and variation in the work face of the chuck is advantageous in the flexibility of application of the chuck but is also advantageous in the economy it affords in installations providing a variety of chuck work. Thus, instead of buying and stocking different complete chucks for chucking different workpieces, a buyer may obtain a single chuck, plus additional mounting plates 18 having differently located mounting holes 22, and, if needed, may also obtain substitute chuck jaw assemblies. Thus, what is essentially a single chuck device may be adapted to meet varying chucking requirements.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the inveniton is therefore claimed in any of its forms or modifications within the legitimate and valid scope of the appended claims.

What is claimed is:

1. A chuck, including a body recessed on one side thereof, a locator plate mounted on said body in closing relation to the recessed area thereof, chuck jaws carried by said plate and adapted for rocking motion in a common plane parallel to said locator plate, said jaws being adapted to grip an interposed workpiece, the workpiece being brought to the plane of said jaws by a generally axial motion toward said locator plate, a spring biased plunger carried by said plate for relative longitudinal motion depressed inward by the movement of the workpiece into the plane of said arms, and a common actuating means for said chuck jaws movable in opposed senses to bring about gripping and releasing movements of said chuck jaws and to relieve and reapply stress to said spring biased plunger.

2. A chuck, including a body, an ejector member supported for reciprocable movement relative to the body, said member having one end in projecting relation to the body, a workpiece being brought to chucking position on the chuck engaging said one end of said member and displacing said member inwardly, spring means stressed by inward displacement of said member, movable means in said body providing a base for said spring means, and chuck jaws settable to gripping and releasing positions relative to the workpiece, said jaws being movable to one of said positions by said movable means and being movable to the other of said positions under control of said movable means.

3. A chuck, including a recessed body, a closure plate detachably mounted on said body, workpiece engaging means carried by said plate in outwardly and inwardly projecting relation thereto including a relatively reciprocable ejector member and a plurality of chuck jaw assemblies, the former being centrally disposed of the latter, compression spring means in said body engaging said ejector member, and movable means in said body providing a base for said spring means and serving as an actuator for said chuck jaw assemblies.

4. A chuck according to claim 3, wherein said chuck jaw assemblies include jaws settable to gripping and releasing positions relative to the workpiece, characterized by spring means comprised in each of said assemblies urging said jaws to one of said positions, said movable means in said body moving said jaws to the other one of said positions and controlling the movement of said jaws to the other one of said positions.

5. A chuck, including a recessed body, a closure plate detachably mounted on said body, workpiece engaging means carried by said plate in outwardly and inwardly projecting relation thereto including a relatively reciprocable ejector member and a plurality of chuck jaws settable to gripping and releasing positions relative to a workpiece, said ejector member being centrally located relative to said jaws, spring means in said body acting on said ejector member, other spring means urging said chuck jaws to gripping position, and means in said body movable in one sense to stress said spring means and to move said chuck jaws to releasing position and movable in an opposing sense to relieve said spring means and to control the motion of said chuck jaws to gripping position.

6. A chuck according to claim 5, characterized by means for moving said movable means in one sense, said movable means having a floating mounting in said body between said last named means and said spring means.

7. A chuck according to claim 5, characterized in that said ejector member is normally relatively extended by the first said spring means in the releasing position of said chuck jaws, movement of the workpiece to a position centrally of said jaws to be gripped thereby pressing said ejector member inward and stressing the first said spring means.

8. A chuck, including a body providing a recessed area opening through a face of the body, a pressure plate reciprocable in said body in said recessed area, a mounting plate on said body in closing relation to said recessed area, said mounting plate having a first through longitudinal opening and other through longitudinal openings radially disposed relative to the said first opening, an ejector member received in said first opening for relative longitudinal and unison rotary motions with respect to said mounting plate, an inner end of said member projecting into the recessed area of the body, a spring interposed between the said inner end of said ejector member and said pressure plate, and a chuck jaw assembly carried in each of said other openings, each of said assemblies including a component extending into said recessed area and cooperable with said pressure plate to reciprocate therewith and further including another component outside said recessed area having an oscillatory motion in response to reciprocating motion of the first said component.

9. A chuck according to claim 8, characterized in that said ejector member and said chuck assemblies are removably held in their respective openings in said mounting plate and further in that said mounting plate is detachably installed on said body, the chuck being adaptable by a substitution of mounting plates or of jaw assemblies or both for use with workpieces of different size and character.

10. A chuck, including a body providing a recessed area opening through a face of the body, a pressure plate reciprocable in said body in said recessed area, said plate having a floating mounting in said body, a mounting plate on said body in closing relation to said recessed area, means entering said body through an opposing face and engagable with said pressure plate to move it toward said mounting plate, an ejector member carried by said mounting plate for relative longitudinal and unison rotary motions and having an inner end received in said recessed area and an outer end projecting outwardly of said mounting plate, spring means interposed between the said inner end of said ejector member and said pressure plate whereby relative approaching motions of said pressure plate and ejector members serves to stress said spring means, and a plurality of chuck jaw assemblies carried by said mounting plate in generally parallel radially spaced relation thereto, each of said assemblies having a jaw component outside said mounting plate and adapted to rock to gripping and releasing positions relative to an interposed workpiece interposed between said jaws in a motion displacing said ejector member inwardly, each of said jaw assemblies further comprising a component extending through said mounting plate into said recessed area into engagement with said pressure plate therein, and each of said chuck jaw assemblies further comprising a connection between each of said inwardly extending components and a respective jaw to convert axial reciprocating motion of said component into a rocking motion of the jaw and further comprising a spring urging said component inwardly against said pressure plate.

11. A chuck according to claim 10, characterized in that said mounting plate is formed with through longitudinal openings receiving said ejector member and said chuck jaw assemblies, said assemblies being removably installed in their respective openings for a substitution of chuck jaw assemblies in accordance with the character of the work, and said mounting plate being detachably installed on said body for substitution of plates having a different arrangement of through longitudinal openings therein to adapt the chuck for use with workpieces of different size.

References Cited in the file of this patent
UNITED STATES PATENTS

| | | |
|---|---|---|
| 2,681,229 | Grobey | June 15, 1954 |
| 2,872,198 | Motz | Feb. 3, 1959 |
| 2,885,212 | Garrison | May 5, 1959 |
| 2,890,053 | Walker | June 9, 1959 |
| 2,911,223 | Garrison | Nov. 3, 1959 |